No. 796,049. PATENTED AUG. 1, 1905.
T. DUNCAN.
ELECTRICAL MEASURING INSTRUMENT.
APPLICATION FILED AUG. 26, 1901.
2 SHEETS—SHEET 1.
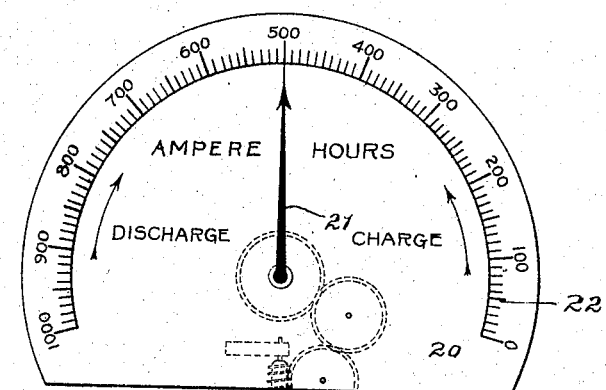
Fig. 1.
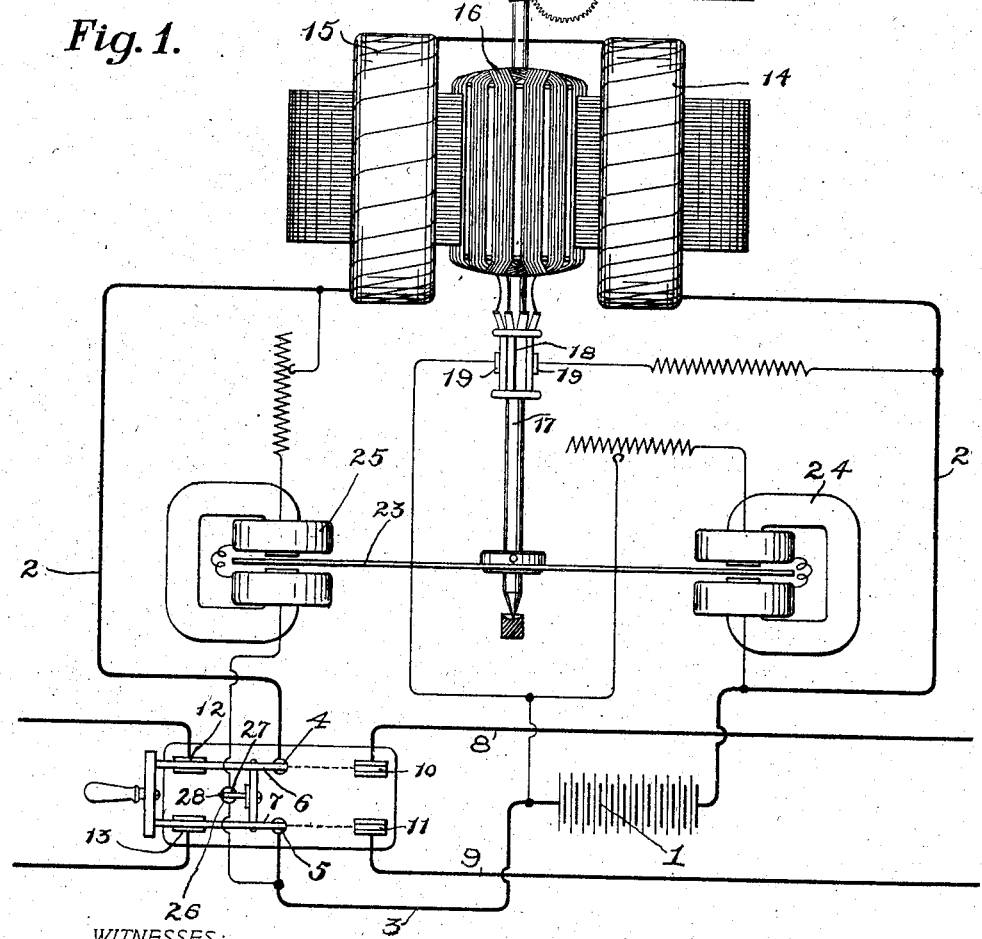
WITNESSES:
Harvey L. Hanson.
Max W. Zabel.
INVENTOR.
Thomas Duncan
BY Charles A. Brown
Bragg & Bilfield
ATTORNEYS.

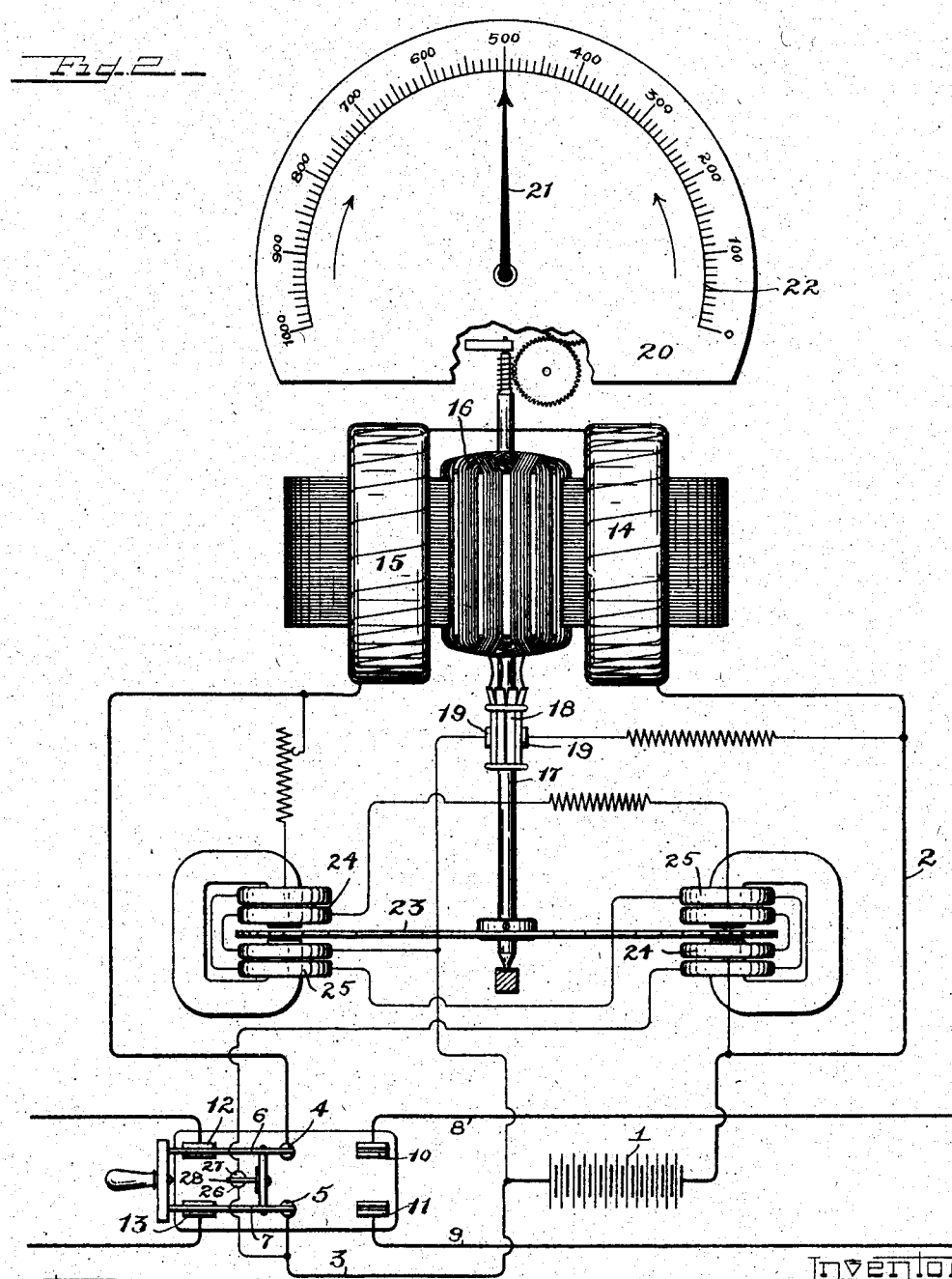

UNITED STATES PATENT OFFICE.

THOMAS DUNCAN, OF CHICAGO, ILLINOIS, ASSIGNOR TO DUNCAN ELECTRIC MANUFACTURING COMPANY, OF LAFAYETTE, INDIANA.

ELECTRICAL MEASURING INSTRUMENT.

No. 796,049.     Specification of Letters Patent.     Patented Aug. 1, 1905.

Application filed August 26, 1901. Serial No. 73,323.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to storage-battery meters, and has for its object the provision of improved means whereby the indicator of the meter may be caused to operate at different rates of speed per unit of load or energy, so that the meter may operate at a slower rate of speed while the battery is being charged and at an increased rate of speed while the battery is discharging to compensate for battery loss.

In my present invention I provide for an adjustable load for the meter, the load being decreased when the storage battery is thrown into circuit with the translating means supplied with current therefrom and increased when the storage battery is thrown into circuit with the charging-machine. To effect this result, I preferably provide the meter with a damping-disk, with which is coöperatively associated an electromagnet adapted to exert a braking effect upon the disk, thereby imposing a load upon the meter. This load may be lessened or totally removed when the storage battery is in circuit with translating devices receiving current therefrom and brought completely into action when the storage battery is in circuit with the charging-machine. Where an electromagnetic load-creating device is employed, I preferably include the same in bridge between the battery leads or mains, so that a change of the pressure will be accompanied by a corresponding change in the imposed load, so that the instrument will not be thrown out of adjustment upon variation in pressure.

I will explain my invention more fully by reference to the accompanying drawings, in which—

Figure 1 is a diagrammatic view of a storage battery, a main circuit-changing switch, and a meter constructed in accordance with my invention associated therewith, the storage battery being shown as connected with the charging-circuit. Fig. 2 is a view similar to Fig. 1, including a modification of the apparatus, part of the reading-dial being broken away.

Like parts are indicated by similar characters of reference in both views.

A storage battery 1 is connected by mains 2 and 3 with the pivotal mountings 4 5, supporting the blades 6 and 7. The conductors 8 and 9, leading to the translating means supplied with current from the storage battery, terminate in contacts 10 and 11. The charging-machine or other source of current is provided with terminal contacts 12 and 13. When the switch is thrown to the left, it will be apparent that the storage battery is connected in circuit with the charging-machine. When the switch is thrown to the right, the translating means are included in circuit with the battery.

The meter is provided with a current-winding subdivided into coils 14 and 15, included in series, for example, with the main 2 and a winding 16, preferably constituting a pressure-winding in the form of an armature. The armature-winding may be mounted upon a rotatable shaft 17, upon which may be secured a commutator 18, engaging brushes 19, serving to include the armature in bridge of the battery-leads. The upper end of the armature-shaft engages a counting-train 20, that actuates an indicator 21, registering with the scale 22. The pointer, if desired, may move in a contraclockwise direction while the battery is being charged and in a clockwise direction while the battery is discharging. The lower end of the armature-shaft may be provided with a damping-disk 23, arranged within the fields of electromagnets 24 25, the damping-disk being solely subject to the influence of the braking action of the electromagnets, if the instrument is to register in units of ampere-hours.

In the system as illustrated in Fig. 1 the winding of the electromagnet 24 is permanently included in bridge between the battery-leads, while the winding of magnet 25 is only included in bridge of the battery-leads when the battery is being charged to impose a load upon the meter to reduce its speed of operation per unit of load or energy, this load being removed when the storage battery is connected in circuit with the translating means, thereby to increase the rate of operation of the meter per unit of load or energy to compensate for battery loss.

In the system illustrated in Fig. 2 the electromagnets 24 25 are each provided with a distinct winding, one winding of each electromagnet being permanently included in bridge of the storage-battery leads, while the other winding is adapted for temporary inclusion in bridge of the storage-battery leads when the storage battery is being charged. The winding of the magnet 25 (illustrated in Fig. 1) or the windings of the magnets 24 and 25, (illustrated in Fig. 2,) that are intended for temporary inclusion in bridge of the battery-leads, may be provided with terminals 26 27, which are electrically connected by a supplemental switch-blade 28 when the main switch is thrown toward the left to include the charging-machine in circuit with the storage battery. While the battery is being charged the additional load furnished by the braking action of the electomagnet 25 of Fig. 1 or by the additional load providing windings of the magnets 24 and 25 (illustrated in Fig. 2) will reduce the rate of speed of the meter per unit of load or energy. When the main switch is thrown toward the right to include the storage battery in circuit with the translating means, this temporary load is removed, permitting the meter to speed up to compensate for battery loss.

By means of my invention I am enabled to measure ampere-hours passing through the battery on charge or discharge, this being accomplished by means of the electromagnetic drag, which compensates for all changes of pressure either due to the battery or to the source of charging-current.

While I have herein shown one particular means for imposing a speed-modifying load upon the meter to compensate for battery loss, I do not wish to be limited to the precise embodiment of the invention illustrated, as modifications may readily be made without departing from the spirit thereof; but,

Having thus described my invention, I claim as new and desire to secure by Letters Patent—

1. The combination with a storage battery, of a switch for changing the connection of the storage battery from translating means to a charging-machine and vice versa, a meter receiving current passing through the storage battery, and means for adding a load to the meter when the charging-machine or source of current is connected with the storage battery, substantially as described.

2. The combination with a storage battery, of a switch for changing the connection of the storage battery from translating means to a charging-machine and vice versa, a meter receiving current passing through the storage battery, and means for reducing the load upon the meter when the storage battery is connected with the translating means to increase the rate of operation of the meter per unit of load or energy to compensate for battery loss, substantially as described.

3. The combination with a storage battery, of a switch for changing the connection of the storage battery from translating means to a charging-machine and vice versa, a meter receiving current passing through the storage battery, a damping-disk for the meter, an electromagnet providing a field for the damping-disk, and a switch for opening and closing the circuit including the winding of the electromagnet to adjust the speed of the meter per unit of load or energy, substantially as described.

4. The combination with a storage battery, of a switch for changing the connection of the storage battery from translating means to a charging-machine and vice versa, a meter receiving current passing through the storage battery, a damping-disk for the meter, an electromagnet providing a field for the damping-disk, and switch parts added to the aforesaid switch and serving when the said switch is changed from one alternative position to another to open or close the circuit including the winding of the said electromagnet, to provide or remove load from the meter to compensate for battery loss, substantially as described.

5. The combination with a storage battery, of a switch for changing the connection of the storage battery from translating means to a charging-machine and vice versa, a meter receiving current passing through the storage battery, and variable retarding means associated with said meter, said retarding means serving to exert an increased retarding influence when the storage battery is being charged and a decreased retarding influence when the battery is being discharged, substantially as described.

6. The combination with a storage battery, of a meter receiving current passing through the storage battery, a damping-disk for the meter, an electromagnet providing a field for the damping-disk, and switch parts added to the aforesaid switch and serving when the said switch is changed from one alternative position to another to open or close the circuit including the winding of the said electromagnet, to provide or remove load from the meter to compensate for battery loss, substantially as described.

7. The combination with a storage battery, of a meter receiving current passing through the storage battery, a damping-disk for the meter, an electromagnet providing a field for the damping-disk, and means for regulating the current passing through said electromagnet, substantially as described.

8. The combination with a storage battery, of a meter receiving current passing through the storage battery, a damping-disk for the meter, an electromagnet providing a field for the damping-disk, and a switch serving, when changed from one alternative position to another, to open or close the circuit including the winding of the said electromagnet, to provide or remove load from the meter to compensate for battery loss, substantially as described.

9. The combination with a storage battery, of a translating-circuit to be supplied thereby, a charging-circuit, switching mechanism for connecting the storage battery with either the charging-circuit or the translating-circuit, a meter adapted to be thrown into operative relation with either of said circuits by said switching mechanism, and a load for the meter varied by said switching mechanism, whereby the rate of operation of the meter is changed when thrown out of relation with one circuit and into relation with the other circuit, substantially as described.

In witness whereof I hereunto subscribe my name this 16th day of August, A. D. 1901.

THOMAS DUNCAN.

Witnesses:
  GEORGE L. CRAGG,
  HERBERT F. OBERGFELL.